United States Patent [19]
Itoh

[11] Patent Number: 5,092,351
[45] Date of Patent: Mar. 3, 1992

[54] MULTI-LAYER FILTER CARTRIDGE
[75] Inventor: Mikio Itoh, Tokyo, Japan
[73] Assignee: Nippon Roki Co., Ltd., Tokyo, Japan
[21] Appl. No.: 493,354
[22] Filed: Mar. 14, 1990
[51] Int. Cl.⁵ ............................................... A24D 3/04
[52] U.S. Cl. ................................. 131/340; 131/341; 131/344; 131/361
[58] Field of Search ............... 131/341, 364, 339, 361, 131/340

[56] References Cited
U.S. PATENT DOCUMENTS

| | | | |
|---|---|---|---|
| 4,022,222 | 5/1977 | Berger | 131/344 |
| 4,034,765 | 7/1977 | Van Hall | 131/344 |
| 4,388,934 | 6/1983 | Luke | 131/344 |

FOREIGN PATENT DOCUMENTS 1023918 3/1966 United Kingdom ............... 131/344

Primary Examiner—V. Millin
Attorney, Agent, or Firm—Armstrong, Nikaido, Marmelstein, Kubovcik & Murray

[57] ABSTRACT

This invention relates to a filter cartridge suited for filtering highly viscous liquid.

According to the invention, non-twisted yarn (sliver) and hard linear material such as strongly-twisted material supporting the non-twisted yarn on the core such as to form inter-yarn pores between the non-twisted yarn and hard linear material.

6 Claims, 2 Drawing Sheets

MULTI-LAYER FILTER CARTRIDGE

BACKGROUND OF THE INVENTION

This invention relates to a multi-layer filter cartridge and, more particularly, to a filter cartridge having a size suited for filtering a highly viscous liquid.

As liquid filter cartridge, there is one in which a filtering material is wound on a cylindrical hard porous core. This filter cartridge is secured for use to a filter case (or vessel). In use, liquid to be filtered is supplied in a pressurized state to the filter cartridge to be passed through and into the same to separate non-dissolved substances in the liquid with the filtering material.

A general-purpose cartridge roughly having a length of 250 mm, an inner diameter of 30 mm and an outer diameter of 64 mm uses a filtering material which consists of filtering paper, metal net, ceramics, metal particles, foamed material, etc. When manufacturing filter cartridge having the same performance, what is called wind filter or wound filter is the most inexpensive where in which large diameter yarn consisting of natural or synthetic fiber is wound with regularity on a cylindrical hard porous core. If it is desired to use other filtering materials, resin binding, sintering and chemical treatment are necessary for providing a mechanical strength sufficient to withstand liquid pressure. In other words, a packing is required for each end of the cartridge to prevent leakage of liquid. In contrast in the wind type filter cartridge; it is only required to set a predetermined tension in the yarn when the yarn is wound, and no packing is required at the ends of the cartridge.

With the wind type filter cartridge, however, liquid is filtered not only between adjacent fiber bundles but also between adjacent fibers constituting the fiber bundle. Therefore, if it is desired to filter a highly viscous liquid, it is necessary to increase the pressure-bearing strength so as not to cause deformation of the filtering material. However, if the winding tension is excessively increased, the filtering material yarn is broken so that winding can no longer be effected. On the other hand, if the filtering material yarn is twisted such that it will not be broken, both filtering gaps in the fiber boundle itself and that between adjacent fiber bundles are lost which results in an impractical filter cartridge having many dead sections to that it does not have a substantial filtering property. At any rate, the wind type filter cartridge is inadequate for the filtering of highly viscous material.

As a further filter using two different filtering materials, there is known one in which yarn is wound cotton inserted in a sheet-like form between adjacent yarn layers, and cotton is tied with strong string. In this filter, liquid is filtered through interstices in the cotton itself. When filtering highly viscous liquid, however, not only is the cotton collapsed but it is also shifted so that it is non-uniformly distributed. Therefore, particles in the liquid to be filtered can not be substantially filtered.

SUMMARY OF THE INVENTION

This invention has an object of providing a multi-layer filter cartridge having a pressure-bearing strength sufficient for filtering highly viscous liquids.

Another object of the invention is to provide a multi-layer filter cartridge which has less dead sections of filtering material, offers low filtering resistance and has a long filtering life.

A further object of the invention is to provide a multi-layer filter cartridge which can capture very fine particles as well and thus has a high filtering efficiency.

The above and other objects and advantages of the invention will become more apparent from the following description.

DETAILED DESCRIPTION OF THE PREFERRED EMBODIMENTS OF THE INVENTION

This invention seeks to provide a multi-layer filter cartridge, which precludes the drawbacks discussed above, and in which non-twisted yarn (sliver) and hard linear material such as strongly twisted yarn for supporting the non-twisted yarn are wound on a cylindrical hard perforated core such that inter-yarn pores are defined by the non-twisted yarn and hard linear material and that the non-twisted yarn is continuously squeezed and supported by the hard linear material to prevent deformation of the non-twisted linear material even when filtering highly viscous liquid.

Now, an embodiment of the invention will be described with reference to the drawings.

Figure 1:
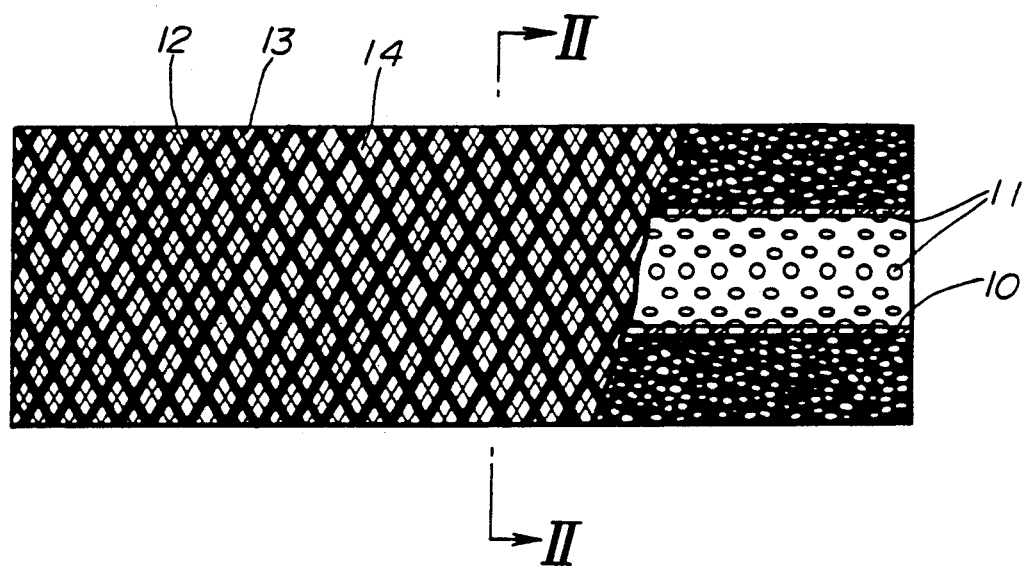
FIG. 1 is a side view, partly broken away, showing a filter cartridge according to the invention.
Figure 2:
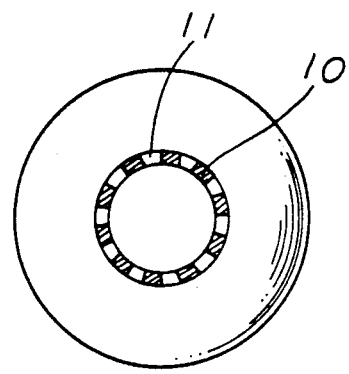
FIG. 2 is a sectional view taken along line II—II in FIG. 1.

FIGS. 1 and 2 show an embodiment of the invention. Cylindrical hard porous core 10 has small holes 11, through which liquid is passed. Strongly twisted yarn 12 and non-twisted yarn (sliver) 13 are wound on core 10 with hard linear material as guide yarn to form inter-yarn pores 14.

According to the invention, the non-twisted yarn is just like sliver capable of providing sufficient filtering property. The hard linear material need not have any filtering property so long as it is in the form of a thin yarn. In addition, it need not be twisted so long as it can sufficiently withstand the tension when the hard linear material is wound. Further, it is possible to use more than one strongly twisted yarn as the hard linear material. Furthermore, it may be made of a material different from that of the non-twisted yarn.

The inter-yarn pores are called either matrices or winding intersections. The size of the inter-yarn pores and the degree of density slope, with which the inter-yarn pores are made thinner as one goes inwardly, may be selected suitably according to the size and balance of particles in the fluid.

The prior art wind type cartridge filtering yarn is roughly required to have two functions, i.e., a function of filtering liquid with fibers forming the yarn and a forming function of preventing collapse and deviation of filtering material by liquid pressure. According to the invention, the filtering material is just like embedded in a bone material. Therefore, the filtering material consisting of non-twisted yarn may have the sole filtering function, and the bone material consisting of the hard linear material may have the sole forming function. Thus, it is possible to satisfy opposing requirements for the prior art filter cartridge that it should have an excellent filtering performance while being capable of maintaining predetermined inter-yarn pores even when certain pressure is applied to the filtering material.

In order to provide the functions according to the invention sufficiently, the filter cartridge according to the invention is suitably impregnated with a binder such as acryl, epoxy and phenol resins, these resins being hardened later. With this construction, the pressure-bearing strength is further improved, and excellent effects can be obtained particularly when filtering highly viscous liquids.

Now, an experiment example will be shown, in which life test and filtering efficiency test were conducted using the multi-layer filter cartridge according to the invention for comparison with the prior art filter cylinder.

The filtering material according to the invention as used for the tests was obtained by winding a filtering material, which was obtained by forming polyester fiber having a fiber thickness of 3 D and a cut length of 72 mm into a sheet-like form by using a carding machine and forming this sheet-like fiber into a sliver with a width of 15 mm and a density of 5 g/m, and a strongly twisted yarn, which was obtained by forming polyester fiber with a fiber thickness of 3 D and a cut length of 72 mm and then twisting the fiber by 2.5 turns/inc. with a twister. The filtering materials were wound simultaneously on a hard porous core using a winding machine and with a tension of 3 kg such that the overall length was 250 mm, the inner diameter was 30 mm and the outer diameter was 64 mm.

A comparison filter cartridge was obtained by winding yarn, which was obtained by forming polyester fiber having a fiber thickness of 3 D and a cut length of 72 mm into a sheet-like form using according machine such that the density was 2 g/m and then twisting this formed fiber by 1.5 turns/inc., on a hard porous core with a tension of 2 kg such that the overall length 250 mm, inner diameter of 30 mm and outer diameter 84 mm.

Figure 3:
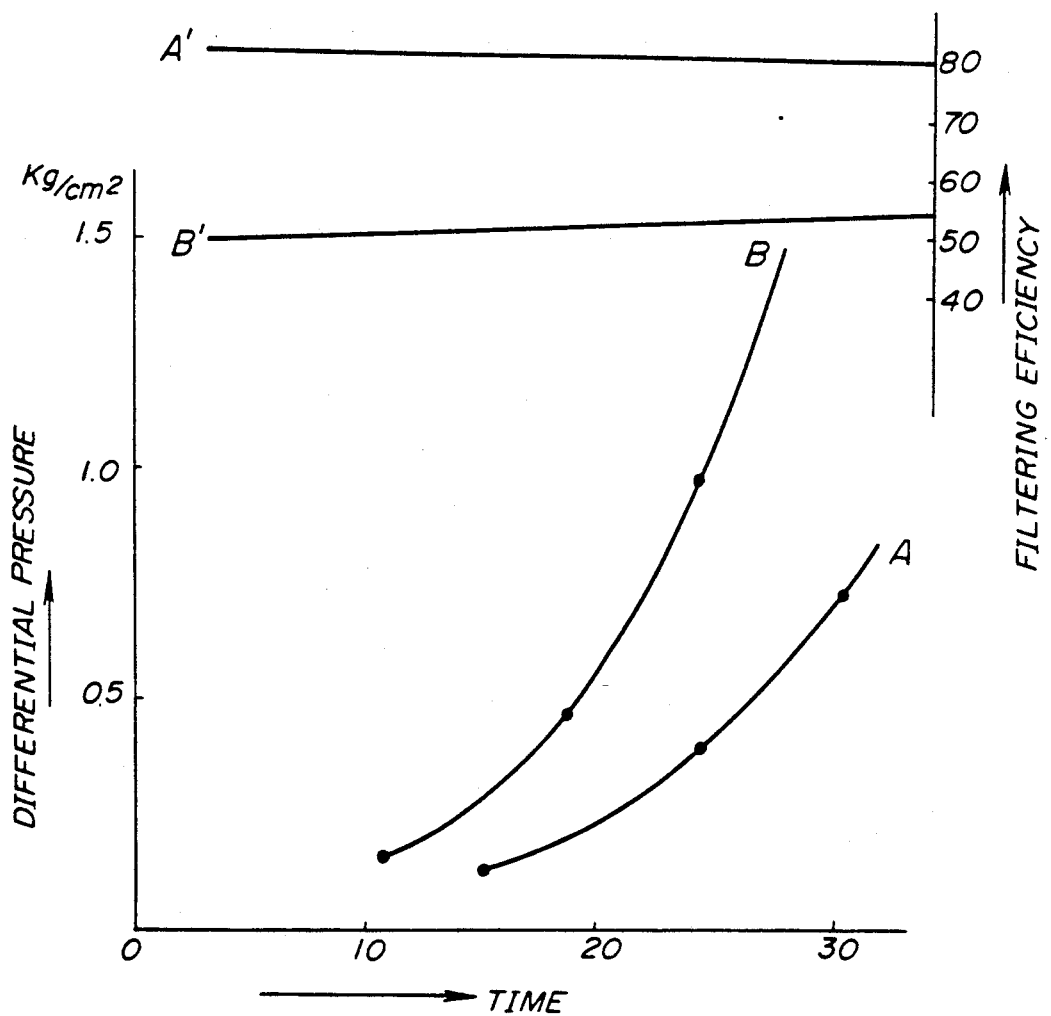
FIG. 3 is a graph showing changes in pressure loss and filtering efficiency plotted against time.

As test liquid was used oil "SAE60" at a temperature of 40° C., and by continuously charging AC fine test dust particles at a rate of 0.03 g/min. into 60 liters of oil, the liquid under test was passed through the test filters at a rate of 15 liters/min. to measure pressure loss increase due to clogging. The results were shown in FIG. 3. In the figure, designated at A is the result obtained with the filter cylinder according to the invention, and B the result obtained with the comparison filter cylinder. Comparative measurement of the dust rates of liquid before and after the filter cartridge was done simultaneously. Filtering efficiency is shown by plots A' and B' (being 100% at the time of perfect removal). Plot A' is obtained with the cartridge filter according to the invention, and plot B' is obtained with the comparison cartridge filter.

As is seen from the above results, with the multi-layer filter cartridge according to the invention, the non-twisted yarn occupies a major proportion of filter, and dead sections are not as great as with the contrast filter (i.e., general wind filter). Therefore, the filtering resistance is low, and also the filtering life is long. Further, since the filtering yarn is non-twisted yarn, cilia can be directly utilized. For this reason, fine particles can be readily captured, thus increasing the filtering efficiency.

What is claimed is:

1. A multi-layer filter cartridge comprising a cylindrical hard porous core, non-twisted yarn and hard linear material in the form of thin yarn supporting said non-twisted yarn, said non-twisted yarn and said hard linear material being wound on said core, said hard linear material functioning as a guide for said non-twisted yarn during winding of said non-twisted yarn and said hard linear material on said core.

2. A multi-layer filter cartridge according to claim 1, wherein said filter cartridge is impregnated with a binder material, said material being hardened later.

3. A multi-layer filter cartridge according to claim 2, wherein said filter cartridge is impregnated with a binder material selected from the group consisting of acryl, epoxy and phenol resins.

4. A multi-layer filter cartridge according to claim 3, wherein said hard linear material includes strongly twisted material.

5. A multi-layer filter cartridge according to claim 3, wherein said hard linear material includes strongly twisted material.

6. A multi-layer filter cartridge according to claim 1, wherein said hard linear material includes strongly twisted material.

* * * * *